United States Patent [19]

Person

[11] 4,231,312
[45] Nov. 4, 1980

[54] FLEXIBLE OCEAN UPWELLING PIPE

[75] Inventor: Abraham Person, Los Alamitos, Calif.

[73] Assignee: Global Marine, Inc., Los Angeles, Calif.

[21] Appl. No.: 935,673

[22] Filed: Aug. 21, 1978

[51] Int. Cl.³ .............................................. E02B 9/00
[52] U.S. Cl. ........................................ 114/264; 9/8 P;
60/641; 138/103; 114/293; 414/138
[58] Field of Search .................... 9/8 P, 8 R; 166/350,
166/359, 367; 415/7; 60/641; 138/103, 177;
405/205, 208, 209, 195, 52; 114/264, 265, 125,
331, 293, 294; 414/138

[56] References Cited

U.S. PATENT DOCUMENTS

| | | | |
|---|---|---|---|
| 2,827,268 | 3/1958 | Staaf | 405/52 X |
| 3,677,302 | 7/1972 | Morgan | 9/8 P |
| 3,802,007 | 4/1974 | Dolan, Jr. | 9/8 R |
| 3,811,477 | 5/1974 | Thawley | 138/103 |
| 3,849,997 | 11/1974 | Gower et al. | 114/293 X |
| 4,116,009 | 9/1978 | Daubin | 9/8 P X |

*Primary Examiner*—Sherman D. Basinger
*Attorney, Agent, or Firm*—Christie, Parker & Hale

[57] ABSTRACT

In an ocean thermal energy conversion facility, a cold water riser pipe is releasably supported at its upper end by the hull of the floating facility. The pipe is substantially vertical and has its lower end far below the hull above the ocean floor. The pipe is defined essentially entirely of a material which has a modulus of elasticity substantially less than that of steel, e.g., high density polyethylene, so that the pipe is flexible and compliant to rather than resistant to applied bending moments. The position of the lower end of the pipe relative to the hull is stabilized by a weight suspended below the lower end of the pipe on a flexible line. The pipe, apart from the weight, is positively buoyant. If support of the upper end of the pipe is released, the pipe sinks to the ocean floor, but is not damaged as the length of the line between the pipe and the weight is sufficient to allow the buoyant pipe to come to a stop within the line length after the weight contacts the ocean floor, and thereafter to float submerged above the ocean floor while moored to the ocean floor by the weight. The upper end of the pipe, while supported by the hull, communicates to a sump in the hull in which the water level is maintained below the ambient water level. The sump volume is sufficient to keep the pipe full during heaving of the hull, thereby preventing collapse of the pipe.

19 Claims, 21 Drawing Figures

FLEXIBLE OCEAN UPWELLING PIPE

REFERENCE TO RELATED APPLICATIONS

The present application contains drawings and detailed descriptions which are very similar to those found in four related applications each of which claims different aspects of the structure and procedure described in the present document. These other applications are as follows:
(1) Ser. No. 935,591 filed Aug. 21, 1978;
(2) Ser. No. 935,641 filed Aug. 21, 1978;
(3) Ser. No. 935,672 filed Aug. 21, 1978; and
(4) Ser. No. 935,674 filed Aug. 21, 1978.
Persons interested in the structures and procedures described in the present document, but not claimed herein, may find it useful to consider patents issued on these other applications or on any divisional or other applications based thereon.

Also, such persons may find it useful to consider the descriptions and claims of commonly-owned copending applications Ser. Nos. 886,904 and 886,907, both of which were filed Mar. 15, 1978. Application Ser. No. 886,904 is now U.S. Pat. No. 4,176,863 and pertains to a tensile core arrangement for a flexible, larger diameter duct suspended in an ocean. Application Ser. No. 886,907 pertains to a stabilizing mass connected to the lower end of an elongate duct disposed pendulously in an ocean.

BACKGROUND OF THE INVENTION

1. Field of the Invention

This invention pertains to large diameter fluid flow ducts for use in ocean engineering and the like. More particularly, it pertains to such a duct which is defined of a flexible material such as high density polyethylene.

2. Review of the Prior Art and Its Problems

Many sophisticated proposals have been made in the field of ocean engineering which call for the use of large diameter vertical ducts of great length extending from at or near the ocean surface to lower ends unconnected to the ocean floor. These proposals include concepts for ocean thermal energy conversion and for mariculture.

The ocean thermal energy conversion (OTEC) concepts propose to use the difference in thermal energy levels between warm surface water and colder deep water to generate electricity, for example. The available energy level difference is low and so these proposals rely on the use of very large quantities of warm and cold water, and call for the necessary large volumes of deep ocean cold water to be brought to the water surface through very large vertical ducts of great length. The rate of water flow through the ducts, called "upwelling ducts" or "riser pipes", would be low, and thus the pressure differential across the walls of the duct would be correspondingly low, especially if the water in the duct is not carried far above the ocean surface before being discharged from the duct.

Any structure which extends vertically for any significant distance in the ocean will encounter at least one ocean current. Currents impose drag forces upon such structure. The larger the structure, the greater its profile (effective area) presented to the current, and therefore the greater the drag forces which a given current will impose on the structure. These drag forces impose bending loads on the structure, and the longer the structure, the more severe the resulting bending stresses. The problem of ocean current drag forces and of the bending stresses produced thereby is a significant difficulty in the offshore drilling industry in regard to the riser pipes which are used to conduct drilling mud during the drilling of a subsea oil or gas well from the well bore to the surface drilling platform. Current-induced bending stresses are so great in these riser pipes that the pipes must be made very heavy, i.e., with thick walls, to enable them to withstand the bending stresses. This problem is such that, because of it, offshore drilling operations today are effectively limited to water depths of about 1000 feet or so. This limit is imposed principally by the riser pipes. An OTEC cold water riser pipe may have a length of 2000 feet or more.

In commonly-owned copending patent application Ser. No. 886,904 filed Mar. 15, 1978, there is described an OTEC upwelling pipe composed of individual lengths of synthetic pipe interconnected by flexible couplings. The pipe assembly is disposed about an elongate tensile core element which carries the weight of the entire pipe assembly. As described in commonly-owned copending application Ser. No. 886,907 filed Mar. 15, 1978, the tensile core of the pipe assembly can also carry the weight of a stabilizing mass suspended below the lower open end of the upwelling duct as such.

These arrangements meaningfully address the problem of bending stresses induced in an upwelling pipe due to ocean current drag forces. The presence of flexible couplings in the pipe, and the presence of spiders across the interior of the pipe between the tensile core and the several pipe lengths, complicates the construction of the overall assembly and presents impediments to the smooth flow of water through the assembly.

In addition to the problem of current-induced stresses in an OTEC riser pipe, there is also the problem of stresses applied to the pipe, especially at its upper end, by motions of the floating structure to which the pipe is connected in use. It has also been proposed to connect the upper end of an OTEC upwelling pipe to the surface-floating structure by a connection which isolates angular motion, as in pitch and roll, of the floating structure from the pipe. This proposal is described in concurrently filed application Ser. No. 935,591.

It is therefore seen that a need exists for an ocean engineering water-flow pipe assembly of great length in which the problem of current-induced bending stresses is effectively resolved, which is simple to construct and to install, and which does not cause undesired resistance to water flow through the pipe.

SUMMARY OF THE INVENTION

This invention effectively addresses the need indentified above. It provides an ocean engineering water flow pipe assembly which can have great length and can be of large diameter, and in which bending and other stresses induced by ocean currents and by motions of a supporting structure are effectively dealt with. The pipe assembly is readily and efficiently constructed, and is structurally simple. The pipe assembly provides enhanced water flow through it, thus making possible the use of smaller pumps and the like to produce a given water mass flow rate. The pipe assembly is readily installed and also enables ready recovery procedures should support thereof be lost, either accidentally or intentionally.

This invention provides an ocean engineering apparatus which comprises a water flow pipe assembly which is adapted to be connected at an upper end thereof to a support structure. The support structure incorporates a pump which is operable for establishing and maintaining water flow through the pipe assembly to the support structure which, in use of the apparatus, is disposed adjacent the surface of an ocean and the like. The pipe assembly is adapted to extend essentially vertically in the ocean downwardly from the support structure to a lower end which is disposed a substantial distance below the support structure and above the ocean floor. The pipe assembly defines at least one essentially continuous water flow conduit which extends essentially from end to end of the pipe assembly. Motion accommodating connection means are provided for connecting the upper end of the pipe assembly to the support structure, and also for isolating from the pipe assembly essentially all motions of the support structure about horizontal axes. The conduit, over a major portion of its length, is defined essentially of a material which has positive buoyancy in sea water; such material also has an effective modulus of elasticity in the temperature range of from about 40° to about 90° F. which is not in excess of about 100,000 lbs. per square inch for at least one hour. The apparatus also includes ballast means connected to the lower end of the pipe assembly. The ballast means has net negative buoyancy in sea water which is sufficiently correlated to the positive buoyancy of the conduit material to establish in the conduit material, at the upper end of the conduit, a selected low tensile stress in the conduit material.

Another aspect of this invention pertains to an ocean engineering facility in which an elongate, vertical, deep-ocean water flow pipe is supported at its upper end by a floating structure. The pipe is so defined, in terms of material and wall thickness, to be sensitive to collapse in response to pressure differentials across the wall of the pipe. In this context, this invention provides an improvement in means for preventing collapse of the pipe in response to pressure differentials attributable to heave of the structure. The apparatus providing the improvement comprises a chamber in the structure to which the upper end of the pipe is substantially directly connectible. Pump means are provided for establishing and maintaining in the chamber a normal water level. The chamber has a volume below such normal water level which is a selected amount greater than the flow area of the pipe times the maximum heave amplitude of the floating structure.

Another aspect of this invention is provided in the context of an ocean engineering water flow pipe assembly which is adapted to be disposed vertically in an ocean for flow of water through the pipe assembly between a lower end disposed above the ocean floor and an upper end releasably supported by a support structure adjacent the ocean surface. The pipe assembly comprises a pipe unit and a weight suspended a selected distance below the pipe unit by a flexible line connected between the weight and the pipe unit. The pipe assembly has overall negative buoyancy, and the pipe unit has positive buoyancy. The selected distance between the weight and the pipe unit is less than the distance between the lower end of the pipe unit and the ocean floor. Such distance is defined in cooperation with the pipe unit so that, in the event of a loss of support of the assembly, the assembly sinks to the ocean floor and the pipe unit comes to a stop within said selected distance, and thereafter floats, submerged; anchored by the weight.

In a preferred embodiment of the pipe assembly, the material used to define the conduit is high density polyethylene. The pipe assembly is therefore flexible, as compared to the rigidity of a steel pipe of comparable length and diameter, and in use complies with, rather than stands against, applied loads.

DESCRIPTION OF THE DRAWINGS

The above-mentioned and other features of this invention are more fully set forth in the following detailed description of the presently preferred embodiment of this invention, which description is presented with reference to the accompanying drawings, wherein.

DESCRIPTION OF THE ILLUSTRATED EMBODIMENT

Figure 1:
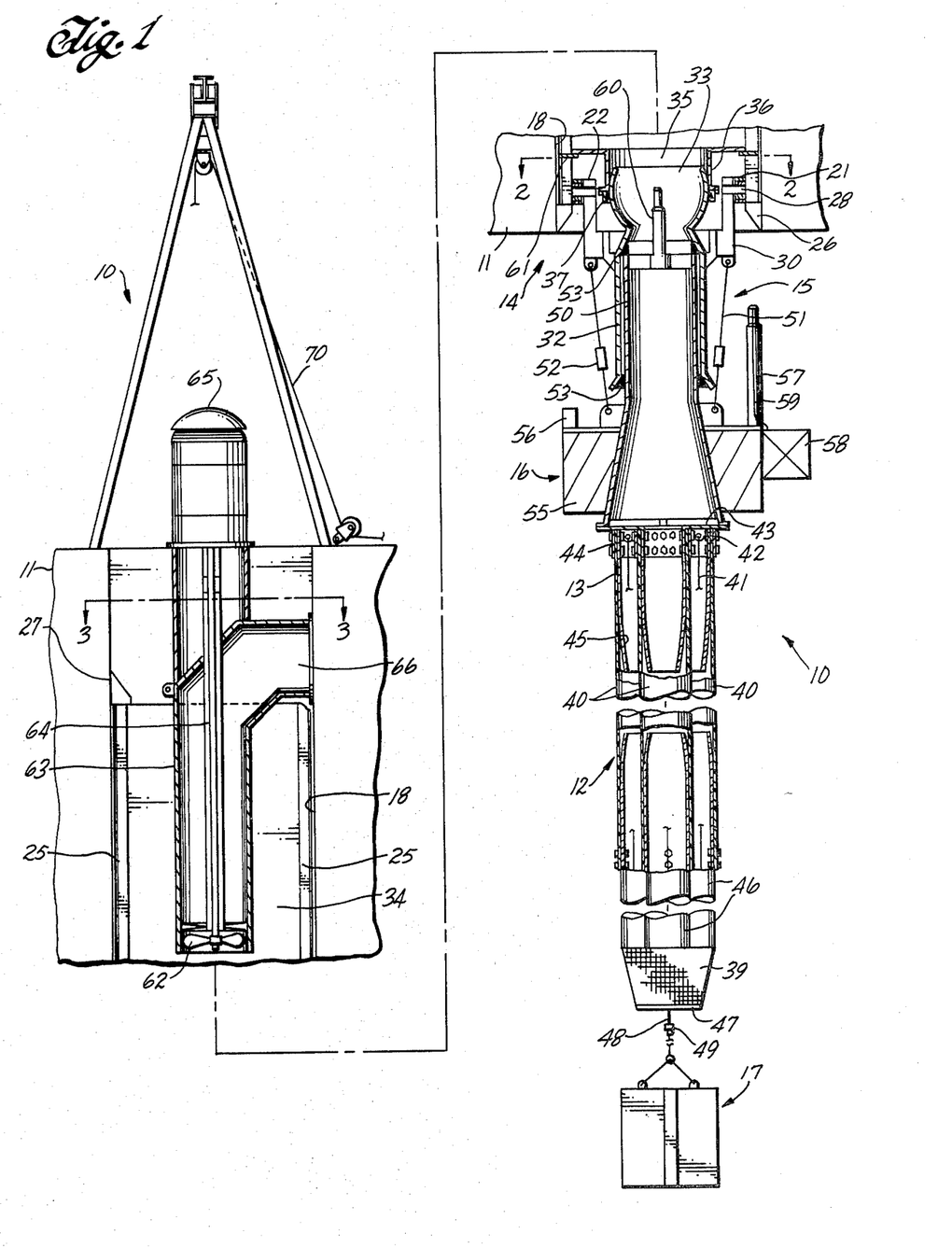
FIG. 1 is a cross-sectional elevation view of an OTEC upwelling pipe assembly and the mechanism by which it is connected to a floating structure.

An ocean thermal energy conversion (OTEC) facility 10 is shown in FIG. 1. FIG. 1 is in two parts, and the broken line which interconnects these two parts shows how they are related to each other.

OTEC facility 10 includes a buoyant hull structure 11 which floats on the surface of an ocean at the desired location of the facility. Hull structure 11 may be the hull of a ship, such as a T-2 tanker, modified to serve as a major component of the OTEC facility, or it can be a structure constructed specially for this purpose. The desired location is at a place where the water depth is sufficiently great that, well below the surface, the temperature of the ocean water is sufficiently lower than the surface water temperature to provide the thermodynamic energy differential necessary to the operation of an OTEC facility. Typically, the water depth at the location where hull 11 is floated may be on the order of 4000 feet or more. Facility 10 also includes an upwelling pipe assembly 12 which is connected at its upper end 13, via a gimbal and ball joint suspension and coupling 14 and a quick-release connector assembly 15, to hull 11. A retrieval assembly 16 is associated with the upper end of the pipe assembly. A stabilizing bottom weight 17 is suspended below the lower end of the pipe assembly.

A well 18 opens through the bottom of the facility hull. The gimbal and ball joint suspension and coupling assembly is located, in use, at the lower end of well 18, and pipe assembly 12 is disposed below the hull substantially coaxially with the vertical centerline of the well.

Figure 2:
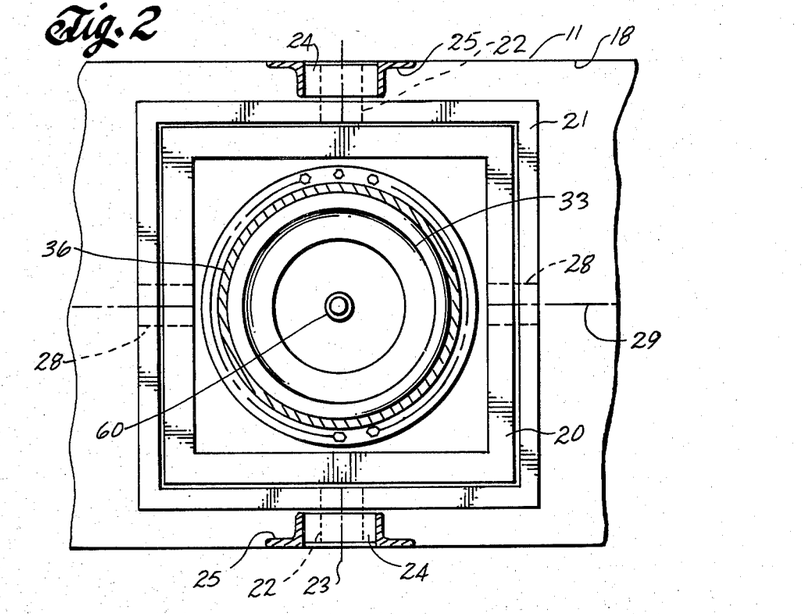
FIG. 2 is a fragmentary cross-sectional view taken along line 2—2 in FIG. 1.
Figure 3:
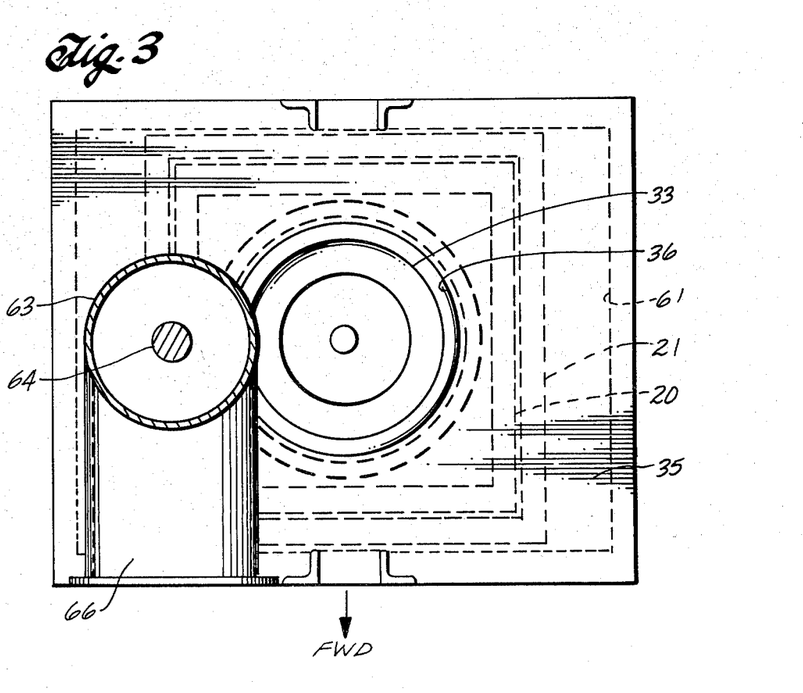
FIG. 3 is a cross-section view taken along line 3—3 in FIG. 1.

As shown in FIGS. 1 and 2, gimbal and ball joint suspension and coupling 14 includes inner and outer gimbal rings 20 and 21. The outer gimbal ring is pivotally supported relative to hull 11 by a pair of trunions 22 which are coaxially aligned along a common axis 23 on opposite sides of the outer gimbal ring. Trunions 22 cooperate in suitable bearings located in the outer gimbal ring and in bearing blocks 24. Each of the bearing blocks cooperates between a pair of vertically extending guides 25 secured to the adjacent surfaces of well 18; the bearing blocks are vertically movable in the hull along the guides. The "in use" position of suspension and coupling 14 is shown in FIG. 1 wherein the bearing blocks are supported on bottom stops 26 secured to the hull to span the space between adjacent pairs of guides 25 closely above the lower end of well 18. Suitable upper stops 27 are provided at the upper ends of the guides within the well to limit the upward extent of movement of the bearing blocks in the guides.

A pair of trunions 28 interconnect the inner and outer gimbal rings at diametrically opposed locations on both of the rings. Trunions 28 are aligned along a second gimbal axis 29 which is perpendicular to and intersects gimbal axis 23. One of the gimbal axes lies in the longitudinal vertical center plane of hull 11, and the other extends transversely of the hull center plane. It is apparent that any structure connected to the inner gimbal ring will tend to remain in a stable position despite angular motions of the hull about either or both of the gimbal axes.

As shown in FIG. 1, the inner gimbal ring 20 includes a frame 30 which depends below the inner gimbal axis. An annular, downwardly open female socket member 32, an element of quick-release connector assembly 15, is connected to frame 30 in such manner that the axis of the socket member passes through the point at which gimbal axes 23 and 29 intersect. The socket member is flared circumferentially of its lower end. Adjacent its upper end, the tubular configuration of the socket member is tapered inwardly for a short distance along the length of the member into connection with the lower end of a hollow ball element 33 which has an outer surface defined as a portion of a sphere. Ball element 33 has its lower end disposed below the point of intersection of the gimbal axes, and has its upper end located above such point. The center of curvature of the ball element is centered upon the point of intersection of the gimbal axes. The ball element is hollow and is open at its upper end. The inner surfaces of the ball element define a portion of the boundaries of a fluid flow path, other portions of which are defined by the interior of pipe assembly 12 and by a cold water sump 34 defined in the lower portions of hull well 18.

The ball joint aspect of suspension and coupling 14 also includes an outer sleeve element 35 which cooperates with the spherical outer surface of the ball element. Sleeve element 35 is carried by the hull of facility 10. Element 35 has a tubular portion 36 which extends along the axis of the well from above and to below the point of intersection of the gimbal axes. At its lower end, tubular portion 36 carries a seal assembly 37 which cooperates with the spherical outer surface of the ball element to provide a substantially liquid-tight seal. This seal, however, is such that the ball element can move relative to the seal assembly. The motions of the ball element relative to the stationary sleeve element 35 are angular motions about the point of intersection of the gimbal axes.

Element 35 preferably defines the floor of cold water sump 34. To this end element 35, except for the presence of tubular portion 36 therein which cooperates with ball element 33, is generally flat and has a peripheral configuration which conforms to the contour of well 18, including appropriate cutouts in its perimeter to enable it to cooperate with bearing block guides 25. Element 35 is supported on its operative position on suitable support flanges 61 which extend inwardly from the walls of the well around its circumference except between adjacent bearing block guides 25.

Pipe assembly 12 is of great length. In a presently preferred embodiment of this invention, pipe assembly 12 has an overall length, from its upper end to the lower portion of a self-cleaning screen assembly 38 located at the lower end of the pipe assembly, of 2185 feet. The pipe assembly is flexible along its length in order that the generation of bending stresses in the pipe assembly due to the effects of ocean currents can be minimized. Preferably the pipe assembly is defined by three parallel lengths 40 of polyethylene pipe having a nominal diameter of 4 feet and a wall thickness on the order of 2 inches. A steel cable 41 extends within each individual pipe length over the entire elongate extent thereof, as shown in FIG. 1. The upper end of each cable 41 is connected to a support padeye 42 which depends from the lower surface of a transverse coupling plate 43 to which the upper end of each pipe length 40 is also connected. The connection of the upper end of each pipe length to the coupling plate is via an annular depending flange 44 which cooperates closely with the outer circumference of each pipe length, and via an elongate tubular blending nipple 45 which cooperates with the inner circumference of each pipe length for a selected distance along the pipe from its upper end. Each pipe and its blending nipple is connected to the corresponding outer circumferential flange 44 by a plurality of bolts passed through the flange, the pipe and the extreme upper end of the corresponding blending nipple.

As shown in FIG. 1, blending nipples 45 are not of constant diameter along their lengths. Rather, proceeding downwardly from their upper ends, they are tapered, preferably in a nonlinear manner, so that they have a diameter at their lower ends which is less than the inner diameter of the corresponding pipe length 40.

In view of the connection of weight 17 to the lower end of the pipe assembly and the gimballed suspension of the pipe assembly from hull 11, it is apparent that the pipe assembly tends to hang in a vertical pendulous manner from the hull. By virtue of the details of its design and construction, pipe assembly 12 is adapted to experience minimum bending stresses therein in response to current drag forces applied to the pipe assembly. The gimballed support of the upper end of the pipe assembly from the hull minimizes the transfer of angular motions of the floating structure, as by reason of roll or pitch in response to wave action, to the pipe assembly. To the extent that any angular motions of a nature such as to induce bending moments in the pipe assembly are transferred from the floating structure to the pipe assembly, such motions, and the loads occasioned thereby, are applied to the upper end of the pipe assembly by the blending nipples in such a manner as to minimize the generation of critical bending stresses within the material of the pipe assembly. This smooth and acceptable transfer of bending moments to the upper end of the pipe assembly is due to the tapered configuration of blending nipples 45. That is, such bending moments as may be applied to the upper end of the pipe assembly from the floating structure in use are not applied directly to the extreme upper end of the pipe assembly, but rather are transferred to the pipe assembly substantially uniformly over a distance corresponding to the length of the blending nipples.

A tubular steel transition and ballast section 46 is connected to the lower end of each pipe length 40, as shown in FIG. 1. Each section 46 has a portion of its length disposed within the lower terminal portion of each pipe length, and the remainder of the section extends below the lower end of the corresponding pipe length into connection with self-cleaning screen assembly 39 which terminates at its lower end at an inlet flow deflector plate 47. The portions of sections 46 which lie within pipe lengths 40 are configured in the same manner as blending nipples 46 to serve the same functions with respect to load transfer as the blending nipples.

As noted above, pipe assembly 12 is of great length; in the presently preferred embodiment, the pipe assembly has a length of 2185 feet from the keel of hull 11 to inlet screen 39. The assembly, when in use, passes through at least one ocean current and is subjected to current-induced drag forces. Because of its large diameter, these drag forces are not insignificant and create in the assembly significant bending moments. These moments are largely static, but the pipe assembly will be subjected to dynamic loads due to vortex shedding and motions of hull 11 in heave and surge, for example. If the pipe assembly were of steel construction, such loadings would require a very heavy assembly having thick walls in order that stress levels in the walls be held within acceptable limits. These problems are avoided in pipe assembly 12 by making the assembly flexible along its length. A flexible pipe assembly deflects with applied loads, rather than stands against the loads. Such an assembly can have thinner walls, effectively, than a rigid pipe assembly.

Pipe assembly 12 preferably is defined of high density polyethylene which has the following properties:

Specific gravity: 0.95±0.002
Poisson's Ratio: 0.3 to 0.5
Thermal Conductivity: 2.5 BTU/hr-ft$^2$-°F.-in.
Coeff. of Thermal Expansion: $9 \times 10^{-5}$ in/in-°F.
Apparent Modulus of Elasticity (psi$\times 10^4$):

| Elapsed Time | 46° F. | 73° F. |
| --- | --- | --- |
| One minute | 14.5 | 11.0 |
| One hour | 7.3 | 5.3 |
| 1000 hours | 4.5 | 3.4 |
| 5 years | 4.0 | 3.0 |

Each of pipes 40 is 2112 feet long and has a nominal diameter of 48 inches; the upper 1386 feet of each pipe length are defined of Series 60 pipe and the lower 726 feet are defined of Series 45 pipe. Tensile members 41 are defined by lengths of 1.0 inch wire rope brought together into a 2 inch wire rope 48. Stabilizing weight 17 has an immersed weight of 75,000 pounds and is disposed 300 feet below the lower end of the pipe assembly. The lower 65 feet of pipe assembly 12 per se are defined by transition sections 46 and by inlet screen 39.

In such an arrangement, the use of polyethylene to define pipe lengths 40 has several advantages which are realizable at relatively low cost. Polyethylene is buoyant in seawater. Positive buoyancy produces simple deployment, release and recovery procedures, resulting in economies of cost and shipboard space and reduced complexity. Polyethylene has desirable physical properties; it is noncorrosive in seawater, not subject to endurance limits in the classical sense, and has smooth surfaces which minimize hydraulic losses, drag forces and biofouling rates. It is easily and effectively handled and welded. Its flexibility greatly reduces dynamic response to induced motions, resulting in low bending stress levels.

Analysis has shown that a polyethylene pipe assembly of the nature described above can adequately withstand environmental loadings, without the occurrence in the polyethylene of permanent molecular rearrangement, for a period of 5 years if installed in the Pacific Ocean off the west coast of Hawaii about 18 nautical miles northwest of Keahole Point and slightly south of Kawaihae where the Hawaiian storm current and the Hawaiian hurricane would be encountered.

It is noted that the presence of the tensioned cables 41 within the pipe lengths 40 enhances the ability of the polyethylene pipe lengths to accommodate the dynamic loads encountered in such an installation.

Figure 4:
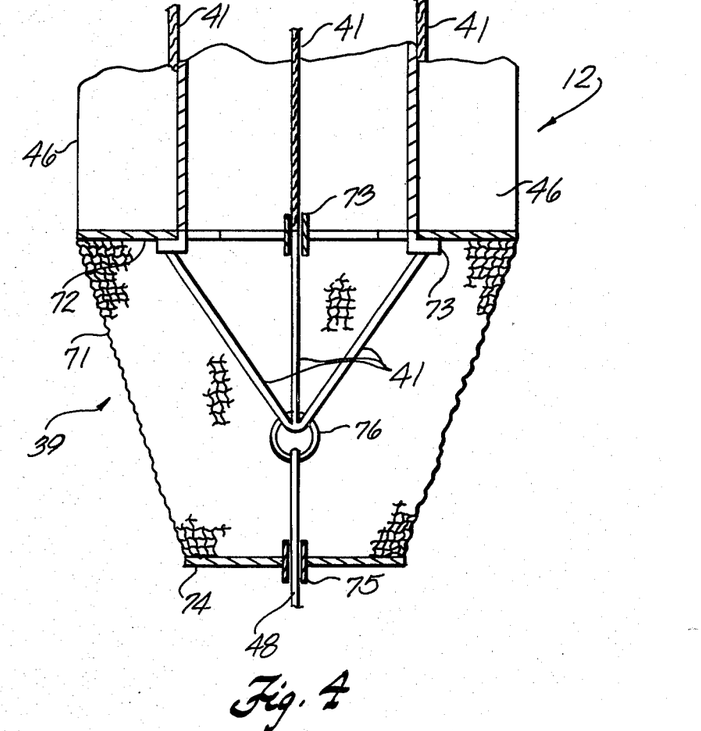
FIG. 4 is an enlarged cross-sectional elevation view of the inlet screen at the lower end of the pipe assembly.
Figure 5:
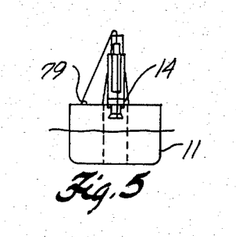
FIGS. 5 through 12, inclusive, are simplified elevation and perspective views which illustrate various stages of a procedure for deploying the pipe assembly and connecting it to the floating structure.
Figure 6:
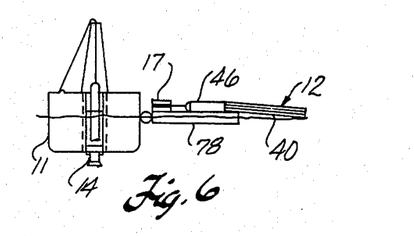
Figure 7:
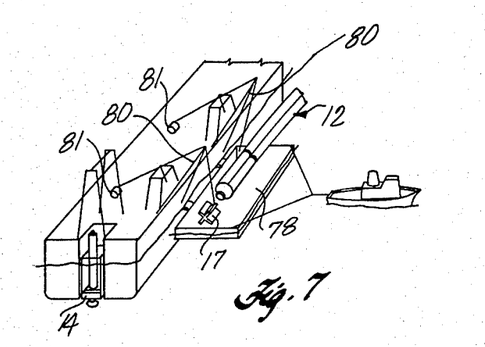
Figure 8:
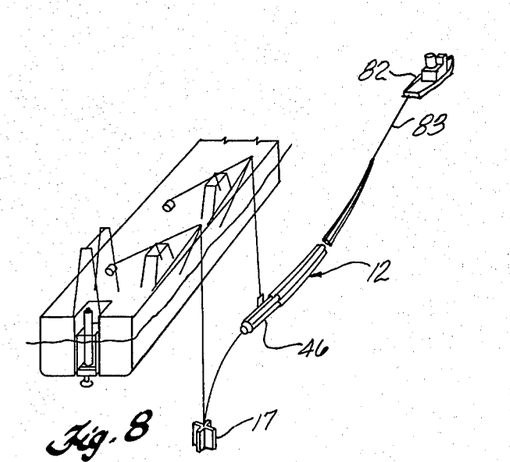

Within the lower extremities of the pipe assembly, i.e., within the vertical extent of self-cleaning screen 39, as shown in FIG. 4, the several steel cables 41 are brought together to define a single steel cable 48 which extends through deflector plate 47. Cable 48 is relied upon to carry the immersed weight of bottom weight 17. An acoustic, remotely operable quick-release coupling device 49 is provided in cable 48 between the lower end of the pipe assembly and bottom weight 17. As shown in FIG. 4, screen 39 is composed principally of flexible steel netting 71 arranged as an inverted conical frustum. The netting is coupled between an upper carrier plate 72, which is connected to the lower ends of lower transition sections 46 and which is generally open in way of the ducts defined by such sections save for spiders which support a tubular guide 73 for each of cables 41 coaxially of the lower end of each section, and a circular bottom closure plate 74. A guide 75 is carried centrally of plate 74 to permit weight support cable 48 to pass through the plate from within the screen where it is connected, as at 76, to the lower ends of the several cables 41. Cables 41 and 48 pass loosely through guides 73 and 75, respectively.

The components of netting 71 are loosely interconnected in the netting, in the manner of chain mail. The netting flow area, porosity, and mesh size are selected to provide significantly greater water flow area through the netting than through the several transition sections 46; the netting does not provide any meaningful restriction on water flow into the lower end of pipe assembly 12. Preferably the netting surface area is about 5 times the flow area of the pipe assembly, the porosity is about 80%, and the mesh size is about 6 by 6 inches. The included angle of the conical frustum (one-half angle) is on the order of 20°.

In use of the pipe assembly, the lower end of the assembly will oscillate and move to and fro in response to vortex shedding as the ocean current moves past the pipe assembly, for example. This will cause the screen bottom plate to rattle relative to weight support cable 48. Such rattling shakes the netting and, in combination with the angle of the netting, frees the netting of any growth thereon and of any matter which might be caught thereon by reason of the water flow through the netting.

Steel cables 41 are relied upon to carry the immersed weight of bottom weight 17. It is apparent, therefore, that pipe assembly 12 is of the tensile core, flexible wall construction described in greater detail in copending application Ser. No. 886,904 filed Mar. 15, 1978. Bottom weight 17 is provided for the reasons described in application Ser. No. 886,907.

Coupling plate 43 at the upper end of pipe assembly 12 is connected to the lower end of a hollow, open-ended male pin coupling member 50, a constant diameter upper portion of which is cooperable with the interior of female socket member 32. Suitable seals 53 are carried by the female member at its tapered sections at the upper and lower ends of its constant diameter portion. These seals cooperate with the interior of the female member, when these two members are engaged, thereby to define an essentially watertight connection between the members. The seals become effective only on the last increment of motion of the male member into the female member. The male and female coupling members of quick-release connector assembly 15 are held in engagement by a plurality of tether cables 51 which are connected at their upper ends to padeyes carried by frame 30, and at their lower ends to padeyes connected to the exterior of the male coupling member. A remote release device 52 is provided in the length of each tether cable.

The length of pin member 50 between the locations at which it engages seals 53 is at least as great as, and preferably is longer than, the diameter of the pin member between the seals. This length is made as great as practicable. Such length is desired to make the engaged connection as insensitive as possible to bending loads applied to it, thereby to isolate the pipe assembly from bending loads, and also to prevent the connection from binding in such a way as to impair the ability of the pin member to drop free of the socket member if and when tether cables 51 are severed.

A recovery buoyancy collar 55 is disposed circumferentially about the lower end of male coupling member 50, below that portion of the member which is engaged in the female socket member when connector assembly 15 is assembled. The buoyancy of the collar is sufficient that, if it becomes necessary to jettison the pipe assembly from the hull, the collar holds the pipe assembly in a vertical attitude after the pipe assembly has dropped to the ocean floor. To facilitate location and recovery of a jettisoned pipe assembly, a locating acoustic pinger 56 and a reestablishment guide post 57 are mounted to the upper extent of the buoyancy collar. A recall buoy is disposed in a suitable container 58 located on the side of the buoyancy collar adjacent the base of post 57. A suitable buoy line 59 is connected from the upper end of post 50 to the buoy located within container 58.

A pipe assembly keelhaul latch post 60 is carried by the upper end of male pin member 50 and extends upwardly into ball member 33 along the axis of the pin member.

Buoyancy collar 55, pinger 56, guide post 57, and the recovery buoy and its container 58 are elements of retrieval assembly 16 which is carried by the upper end of pipe assembly 12 via male pin member 50.

As noted above, pipes 40 preferably are defined of polyethylene; polyethylene is positively buoyant in seawater. In view of the great length of the pipe assembly, blending nipples 46 extend along the pipe assembly a distance which is greater than the length of nipples 45 by an amount (about 65 feet) which is selected to cause the combination of pipes 40 and nipples 46 to have a desired amount of net negative buoyancy. Inlet screen assembly 39 is also negatively buoyant. Thus, the pipes 40 are under a modest axial tensile load in use, rather than a compressive load which otherwise would result from the positive buoyancy of polyethylene and which could cause the pipes to buckle. The net negative buoyancy of the combination of pipes 40 and nipples 46 is less than the net positive buoyancy of collar 55 and the other structure encountered at the upper end of the pipe assembly, including male pin member 50. The net negative buoyancy of weight 17 is greater than the net positive buoyancy of the portion of the pipe assembly above cable 48. For example, in the preferred embodiment described above, the net buoyancies of these components are as follows:

| Male member 50 and upper | |
| --- | --- |
| blending nipples 45 | −20,000 lb |
| buoyancy collar | +30,000 lb. |
| polyethylene pipe | +60,000 lb. |
| lower blending nipples 46 and inlet screen 39 | −65,000 lb. |
| cables 41 and 48 | −17,500 lb. |
| stabilizing weight 17 | −75,000 lb. |

While the sum of these buoyancies is 87,500 lbs. net negative buoyancy, the pipe assembly itself (exclusive of weight 39 and its suspension cables) is 5000 lbs. positive.

In view of the foregoing, it is apparent that, when the structure described above is assembled in the manner shown in FIG. 1, a fluid flow duct, having an inlet at screen assembly 39, is defined from the lower end of the pipe assembly to cold water sump 34 within hull well 18. This duct provides a path for the flow of cold water from deep in the ocean upwardly to OTEC facility 10. Deep ocean cold water is induced to flow upwardly along this path by the action of a pump impeller 62 which is located in the open lower end of a tubular cold water intake duct 63 disposed within sump 34. Impeller 62 is mounted on the lower end of an elongate shaft 64, the upper end of which is connected to a drive motor 65 which preferably is located at the upper end of well 18. Between the pump impeller and drive motor, an elbow 66 is formed in duct 63 to cause cold water drawn into the duct to be discharged into a suitable tank or piping arrangement (not shown) within the hull of OTEC facility 10.

It will be apparent from an examination of the structure shown in the accompanying drawings that this structure provides for the ready and convenient assembly of the overall system, and also for ready jettisoning and recovery of the pipe assembly from the floating structure, as in the event of an emergency. Assembly and initial connection of the pipe assembly to hull 11 is shown, in stages in FIGS. 5 through 12, and jettisoning and recovery of the pipe assembly is shown in stages in FIGS. 13 through 21.

The pipe assembly preferably is made up and assembled at a shore-based location, as on a beach. The appropriate individual lengths of polyethylene pipe are welded together to define the flexible pipe assembly per se; the flotation and retrieval assembly is connected to one end of the piping, and the stabilization weight to the other. The negatively buoyant lower end of the pipe assembly and the stabilizing weight are placed on a barge 78 (see FIG. 6), and the rest of the pipe assembly, all of which is buoyant, is allowed to float behind the barge as it is towed to the installation site where hull 11 has been prepositioned. As so prepositioned (see FIGS. 5 and 6), the gimbal and ball joint assembly 14 will have been lowered in the hull using cable 70 and a winch 79 onboard the hull, and the cold water sump 34 will have been defined in well 18. When the barge arrives at the hull, the gimbal and ball joint assembly is in position adjacent the hull keel; see FIG. 6.

When barge 78 arrives alongside the hull, suitable devices, such as A-frames 80 and winches 81 aboard the hull (see FIG. 7), are rigged and connections made to the stabilizing weight and the lower end of the pipe assembly for controlled lifting and lowering thereof from the hull. The load is lifted from the barge and the barge towed out of the way, and then the load is lowered. As the lower end of the pipe assembly is lowered, an auxiliary vessel 82 maintains tension via a pendant line 83 on the upper end of the pipe assembly, as by connection to latch post 60. The flexibility and positive buoyancy of piping 40 is of benefit during these processes.

Figure 9:
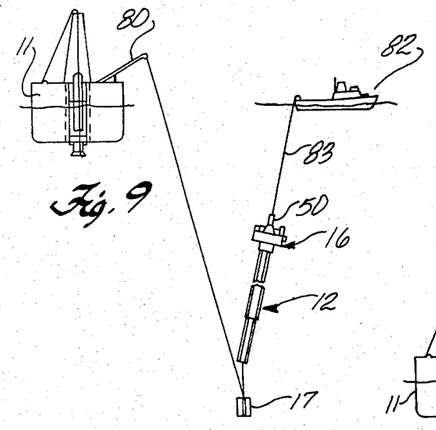
Figure 10:
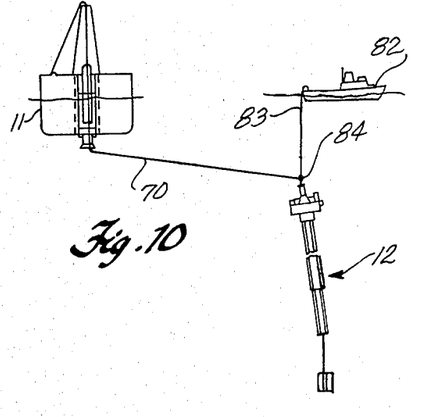
Figure 11:
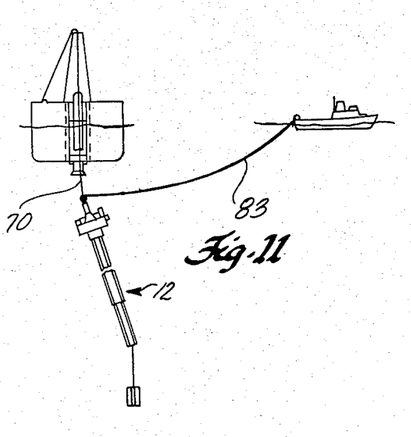
Figure 12:
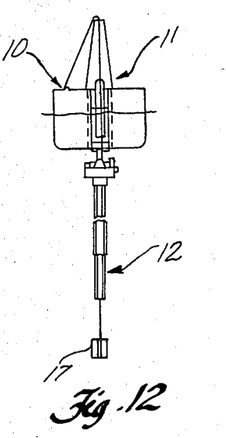
Figure 13:
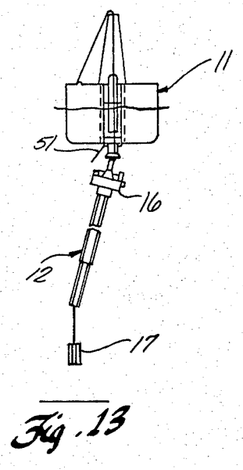
FIGS. 13 through 21, inclusive, are simplified elevation views which illustrate various stages of a procedure for releasing the pipe assembly from the floating structure and recovering and reconnecting a released pipe assembly to the floating structure.
Figure 14:
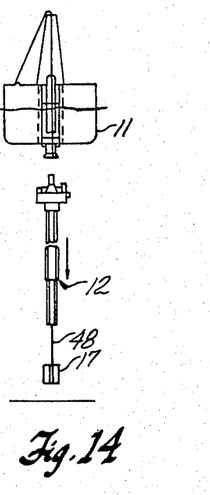
Figure 15:
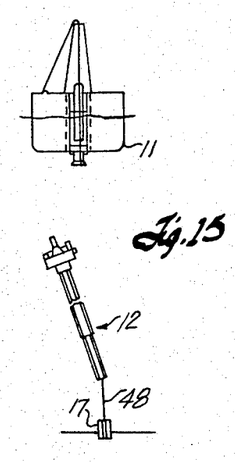

The pipe assembly is lowered until it is vertical and its net negative buoyancy is supported by pendant line 83; see FIG. 9. The lines to weight 17 and the lower end of the pipe assembly are released, and cable 70 is then run down through ball joint 36,37 and to a connection point 84 in the pendant line just above latch post 60; see FIG. 10. The load of the pipe assembly is transferred from the pendant line to cable 70, and the pipe assembly is moved into position below female socket member 32. A diver can then release the pendant line from connection point 84. See FIG. 11. The pipe assembly is then drawn by cable 70 into seating engagement of pin member 50 with socket member 32, and a diver secures tether cables 51. Cable 70 is thereafter disconnected from latch post 60 to enable the pump assembly, including duct 63 and elbow 66, to be lowered into position within sump 34, and to enable the appropriate mechanical connection of the pump assembly to the hull to be made. Preferably, however, the pump assembly is disposed off-center of well 18, so that keelhauling of the pipe assembly into connection with the gimbal and ball joint suspension coupling 14 can be accomplished with the pump assembly in place in sump 34.

If, at any time during the operation of OTEC facility 10, circumstances should occur which would require disconnection of the pipe assembly from the hull, jettisoning of the pipe assembly is a simple matter. An appropriate release signal is generated to cause actuation of remotely operated quick-release couplings 52 associated with tether cables 51. Couplings 52 operate in such manner that the tether cables part substantially simultaneously. As the tether cables part, all support of the upper end of the pipe assembly by the hull is terminated. Since the net buoyancy of the pipe assembly is negative due to the connection of bottom weight 17 to the pipe assembly, the pipe assembly drops downwardly from the hull, carrying male pin member 50 with it but leaving the female socket member and ball element 33 connected to the floating structure via the gimbal arrangement. Once the bottom weight impacts the ocean floor, the pipe assembly is maintained in a vertical attitude by reason of the positive buoyancy of collar 35 at the upper end of the pipe assembly. This is shown, in sequence, in FIGS. 13 through 16.

The length of cable 48, between inlet screen 39 and stabilizing weight 17, is defined so that the pipe assembly cannot damage itself as it is jettisoned, sinks to the ocean floor, and then assumes an essentially erect floating state in which it is anchored by the weight and which facilitates recovery. Upon actuation of quick-release devices 52, the negatively buoyant pipe assembly drops from socket member 32 and accelerates to its terminal freefall velocity; in the embodiment for which various parameters and characteristics have already been set forth, this velocity is about 8 ft. per second. Weight 17, which preferably has a cruciform shape in horizontal cross-section, is suspended sufficiently below the inlet screen by cables 41 and 48 that, once the weight strikes and embeds itself in the sea floor sediment, the net positive buoyancy of the remaining freefalling structure takes effect, in combination with viscous drag forces, to slow and stop the descent of the pipe assembly within the length of cable 48. In the presently preferred embodiment, cable 48 has a length of 300 feet; the pipe assembly will come to a stop from terminal free-fall velocity, after weight 17 strikes bottom, within approximately 200 feet. Thereafter, the pipe assembly floats substantially vertically erect, displaced only by currents, in a fully submerged state moored by weight 17 (see FIG. 16). The lower end of the structure at the upper end of cable 48 never contacts the sea floor.

Figure 17:
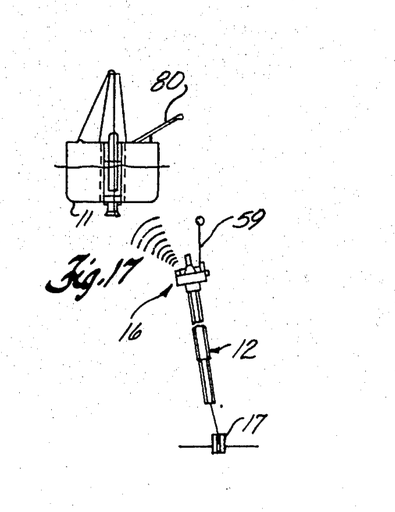
Figure 18:
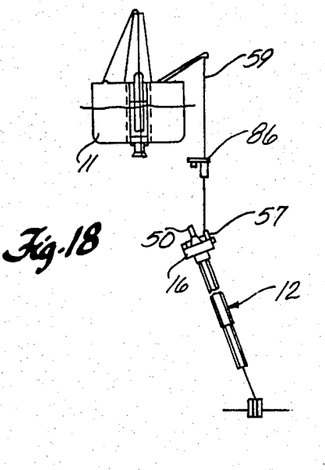
Figure 19:
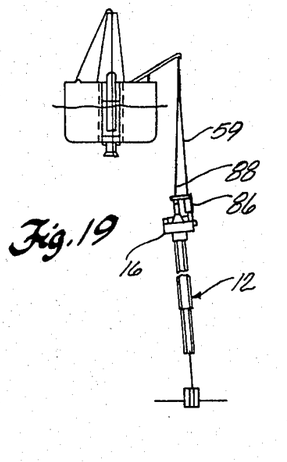
Figure 20:
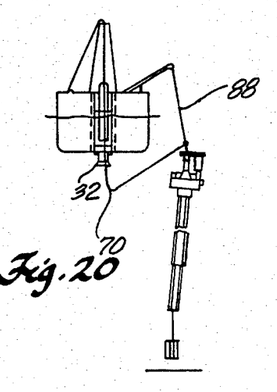

A marker buoy stored in container 58 can be released automatically at the time of jettisoning of pipe assembly from the floating structure, or, as preferred, it can be held captive in its container for subsequent release by a suitable remotely controlled release mechanism at a later time as shown in FIG. 17. The marker buoy provides assistance in reconnecting to the upper end of the jettisoned pipe assembly.

Recovery of the jettisoned pipe assembly from the ocean floor is facilitated by the presence of remotely operable coupling 49 in the connection of bottom weight 17 to the lower end of the pipe assembly. That is, if it is desired to recover a jettisoned pipe assembly without its bottom weight, a suitable signal is generated to cause release mechanism 49 to operate to sever the connection between the bottom weight and the pipe assembly, thereby allowing the pipe assembly to float to the water surface. On the other hand, if it is desired to recover a jettisoned pipe assembly with its bottom weight, such recovery is facilitated by the use of reestablishment guide post 57 and keelhaul latch post 60 which provide the means by which a suitable recovery device 86 (see FIGS. 18-20) can be securely coupled to the jettisoned pipe assembly for recovery of the same. Marker buoy cable 59 provides a means for guiding the recovery device into registry with guide and latch posts 57 and 60.

Figure 16:
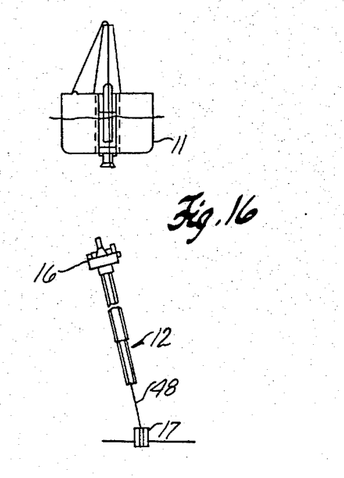
Figure 21:
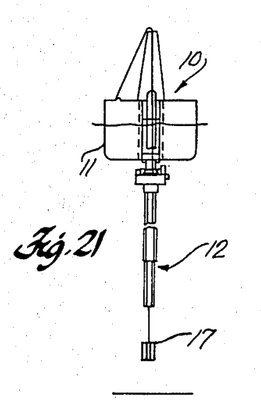

The preferred procedure for recovering a jettisoned pipe assembly, with its stabilizing weight, to hull 11 is shown in FIGS. 17 through 21. An A-frame 80 is rigged to the side of the hull (FIG. 17) so that buoy line 59 can be taken aboard the hull after release of the marker buoy (FIG. 16). Line 59 is rigged through the recovery device which is then lowered along line 59 into contact with guide post 57. The recovery device preferably is a Regan reestablishment tool which carries a lift cable 88 with a Regan latch at the bottom matable with latch post 60. When the recovery device reaches guide post 57, it cooperates with an orientation cam which properly orients the device on the post so that further movement of the device downwardly on the post causes the lift line to connect to post 60 (see FIGS. 18 and 19). The pipe assembly is then handled as described above with reference to FIGS. 10 and 11, using cable 70 and divers, to reconnect pin member 50 to socket member 32. The fully recovered and reconnected pipe assembly is shown in FIG. 21.

Pipe assembly 12 is made as light as possible consistent with the conditions it must withstand in use. The presence of sump 34 in hull 11 contributes to this objective. The normal water level in sump 34 is below the load waterline of the hull. A water level in the sump below sea level is maintained by the operation of pump 65. This difference between sea level and sump water level (preferably about 5 feet) provides a driving head differential which is sufficient, in combination with the water flow area of the pipe assembly, to cause water to flow upwardly through the pipe assembly with the desired average mass flow rate. However, hull 11 is subjected to wave action which, besides the rolling and pitching motions already noted, can cause the hull to heave, i.e., move cyclically in a vertical direction. The volume of sump 34 below its normal water level is several times greater than the volume obtained by the product of (1) the maximum heave amplitude of the hull (double amplitude) and (2) the flow area of the pipe assembly; in the preferred arrangement shown, the sump volume is about 15 times greater than the expected maximum heave amplitude of 6.6 feet (on the order of 7 feet) times the duct flow area of about 50 square feet. In this way, it is assured that the pipe assembly is always full of water during heaving motion of the hull, and the differential pressures across the walls of the pipe assembly, tending to collapse the pipe walls, are kept within acceptable limits. This, in turn, allows the pipe assembly to be made lighter than if it were required to withstand higher collapse loads.

The operation of pump 65 is controlled, by the assistance of suitable water level sensors in sump 34, to maintain the desired water level in the sump.

It will be apparent from the foregoing that all of the vertical loads between the floating structure and the submerged, pendulously supported pipe assembly are carried by the gimbal arrangement. The ball joint does not carry any pipe loads since it is located at the gimbal center of rotation. The ball joint functions solely as a passage which accommodates gimbal motions for carrying cold water across the gimbal-hull interface. All pipe assembly loads are carried directly into the gimbal structure, thereby minimizing creation of motion-induced bending stresses in the upper portions of the pipe assembly. The use of a ball joint seal in combination with the gimbal arrangement allows the primary cold water pump in the facility to be fixed to the floating structure. No other flexible joints, other than the ball joint, are required in the cold water duct. Suitable sealing of the ball joint is a simple matter and can be accomplished using standard pressure-loaded sealing techniques which are not intended to provide a 100% effective seal. With a small pressure drop (on the order of a 5 foot head) across the ball joint seal, any leakage across the ball joint will be minimal. The use of a male pin at the upper end of the pipe assembly, mating with a female socket below the gimbal arrangement, affords a simple mechanism for releasing the pipe assembly in an emergency. The bearing and seal rings provided between the male pin and the female socket carry the minimal moment and shear loads which may occur between the gimbal and the pipe assembly in a completed installation. Vertical loads are carried by tether cables 51. When the remote release devices (which may be electric, hydraulic or acoustic) in the tether cables are operated, the male pin carried by the upper end of the pipe assembly can easily fall free from the gimballed female socket. In use, the gimballed arrangement is located below the water line of the floating hull, thereby itself incurring minimal motions of the hull. The entire gimbal assembly can be raised in its well to above the load waterline of the hull for the purposes of maintenance.

Persons skilled in the art to which this invention pertains will appreciate that the preceding description has been presented with reference to the presently preferred embodiment of the invention as illustrated in the accompanying drawings. It will be understood, however, that the present invention can be manifested in embodiments different from the described embodiment. The preceding description sets forth the presently known best mode of practicing this invention, but certainly not all possible modes. Accordingly, workers skilled in the art will readily appreciate that modifications, alterations or variations in the arrangements and procedures described above may be practiced without departing from, and while still relying upon, the essential aspects of this invention.

What is claimed is:

1. An ocean engineering apparatus comprising a water flow pipe assembly adapted to be connected at an upper end thereof to a support structure, the support structure incorporating a pump operable for establishing and maintaining water flow through the pipe assembly to the support structure which is disposed adjacent the surface of an ocean and the like, the pipe assembly being adapted to extend essentially vertically in the ocean downwardly from the support structure to a lower end disposed a substantial distance below the support structure and above the ocean floor, the pipe assembly defining at least one essentially continuous water flow conduit extending essentially from end-to-end of the pipe assembly, motion accommodating connection means for connecting the upper end of the pipe assembly to the support structure and for isolating from the pipe assembly essentially all motions of the support structure about horizontal axes, the conduit over a major portion of its length being defined essentially of a material having positive buoyancy in sea water and which has an effective modulus of elasticity in the temperature range of from about 40 degrees F. to about 90 degrees F. not in excess of about 100,000 pounds per square inch for at least one hour, and ballast means connected to the lower end of the pipe assembly having net negative buoyancy in sea water sufficiently correlated to the positive buoyancy of the conduit material to establish in the conduit material at the upper end of the conduit a selected low tensile stress in the conduit material.

2. Apparaus according to claim 1 wherein the material is a synthetic thermoplastic resin material.

3. Apparatus according to claim 2 wherein the material is high density polyethylene.

4. Apparatus according to claim 1 wherein the conduit has a length in the order of about 2000 feet.

5. Apparatus according to claim 4 wherein the pipe has a diameter of at least about 4 feet.

6. Apparatus according to either one of claims 4 or 5 in which the pipe assembly is comprised of a plurality of conduits each defined of said material, the conduits being disposed parallel to each other in a bundle in a noncoaxial manner.

7. In an ocean engineering facility in which an elongate vertical deep ocean water flow pipe is supported at its upper end by a floating structure, the pipe being so defined, as in terms of material and wall thickness, as to be sensitive to collapse in response to pressure differentials across the walls thereof, the improvement in means for preventing collapse of the pipe in response to pressure differential attributable to heave of the structure, and comprising a chamber in the structure to which the upper end of the pipe is substantially directly connectible, pump means for establishing and maintaining in the chamber a normal water level, the chamber having a volume below said normal water level which is a selected amount greater than the flow area of the pipe times the maximum heave amplitude of the floating structure.

8. Apparatus according to claim 7 wherein the normal water level in the chamber is below the load waterline of the floating structure.

9. Apparatus according to claim 8 wherein said volume of the chamber is on the order of 15 times greater than the product of the pipe flow area and the maximum heave amplitude.

10. Apparatus according to claim 9 wherein the maximum heave amplitude is on the order of 7 feet and the pipe flow area is on the order of 50 square feet.

11. Apparatus according to any one of claims 7 through 10 wherein the pipe is defined of a synthetic thermoplastic resin.

12. Apparatus according to claim 11 wherein the resin is high density polyethylene.

13. Apparatus according to claim 12 wherein the difference between the water levels inside and outside the chamber is about 5 feet, and the pipe has a diameter of about 4 feet and a wall thickness of about 2 inches.

14. An ocean engineering water flow pipe assembly adapted to be disposed vertically in an ocean for flow of water therethrough between a lower end disposed above the ocean floor and an upper end releasably supported by a support structure adjacent the ocean surface, the pipe assembly comprising a pipe unit and a weight suspended a selected distance below the pipe unit by a flexible line connected between the weight and the pipe unit, the pipe assembly having overall negative buoyancy and the pipe unit having positive buoyancy, said selected distance being less than the distance between the lower end of the pipe unit and the ocean floor and being defind in cooperation with the pipe unit so that, in the event of a loss of support of the assembly, the assembly sinks to the ocean floor and the pipe unit comes to a stop within said selected distance and thereafter floats submerged anchored by the weight.

15. Apparatus according to claim 14 wherein said selected distance is defined in consideration of the mass, buoyancy and hydrodynamic drag characteristics of the pipe unit.

16. Apparatus according to claim 14 wherein the line extends inside the pipe unit and is connected to the pipe unit substantially at the upper end thereof.

17. Apparatus according to claim 16 wherein the major portion of the length of the pipe unit is defined of a material having positive buoyancy in seawater, and ballast means at the lower end of the pipe unit having negative buoyancy greater than the aggregate positive buoyancy of said material.

18. Apparatus according to claim 17 including positively buoyant floatation means connected to the pipe unit at the upper end thereof, the floatation means having buoyancy greater than the algebraic sum of the buoyancies of the material and the ballast means.

19. Apparatus according to claim 14 wherein the pipe unit has a length on the order of about 2000 feet and said selected distance is on the order of about 300 feet.

* * * * *

UNITED STATES PATENT AND TRADEMARK OFFICE
CERTIFICATE OF CORRECTION

PATENT NO. : 4,231,312
DATED : November 4, 1980
INVENTOR(S) : Abraham Person

It is certified that error appears in the above—identified patent and that said Letters Patent is hereby corrected as shown below:

Column 1, line 31, between "BACKGROUND OF THE INVENTION" and "Field of the Invention", insert as a new paragraph:

-- The Government has rights in this invention pursuant to Contract No. DE-AC03-78ET20539 (formerly ET-78-C-03-1785) awarded by the U.S. Department of Energy. --

Signed and Sealed this

Twenty-seventh Day of April 1982

[SEAL]

Attest:

GERALD J. MOSSINGHOFF

Attesting Officer     Commissioner of Patents and Trademarks